United States Patent [19]

Hamner

[11] 4,212,771

[45] Jul. 15, 1980

[54] METHOD OF PREPARING AN ALUMINA CATALYST SUPPORT AND CATALYST COMPRISING THE SUPPORT

[75] Inventor: Glen P. Hamner, Baton Rouge, La.

[73] Assignee: Exxon Research & Engineering Co., Florham Park, N.J.

[21] Appl. No.: 931,330

[22] Filed: Aug. 8, 1978

[51] Int. Cl.² .................. B01J 29/06; B01J 29/04; B01J 23/08
[52] U.S. Cl. ..................... 252/455 Z; 252/455 R; 252/463
[58] Field of Search ............. 252/455 R, 455 Z, 463

[56] References Cited

U.S. PATENT DOCUMENTS

| | | | |
|---|---|---|---|
| 2,921,033 | 1/1960 | Houdry | 252/463 X |
| 3,038,865 | 6/1962 | Abrahams | 252/466 |
| 3,622,500 | 11/1971 | Alpert et al. | 208/111 |
| 3,628,914 | 12/1971 | Graulier | 252/463 X |
| 3,630,888 | 12/1971 | Alpert et al. | 252/463 X |
| 3,846,286 | 11/1974 | Phillipson | 208/216 |
| 3,997,476 | 12/1976 | Cull | 252/463 |
| 4,087,383 | 5/1978 | Gernand et al. | 252/455 R |

Primary Examiner—Carl F. Dees
Attorney, Agent, or Firm—Marthe L. Gibbons

[57] ABSTRACT

A catalyst support is prepared by grinding a calcined alumina to a powder, compacting the powder at an elevated pressure, recracking the compressed powder to a predetermined size particle and acid extracting the particle. The support can be composited with catalytic components such as hydrogenation components and/or zeolites and used in a variety of hydrocarbon treating processes, such as hydrodefining, hydrodesulfurization, hydroconversion, reforming, and catalytic cracking.

36 Claims, 3 Drawing Figures

METHOD OF PREPARING AN ALUMINA CATALYST SUPPORT AND CATALYST COMPRISING THE SUPPORT

BACKGROUND OF THE INVENTION

1. Field of the Invention

This invention relates to a method for the preparation of an alumina catalyst support, a catalyst comprising the support and hydrocarbon treating processes utilizing the catalyst.

2. Description of the Prior Art

It is known to extract calcined alumina which may have been formed into the desired shape with an acid to dissolve a portion of the alumina and, thereby, produce an alumina catalyst support substantially free of pores smaller than 70 Angstroms while having a pore volume substantially the same as that of the non-acid extracted alumina. See U.S. Pat. No. 3,038,865.

It is known to prepare active alumina agglomerates of high mechanical strength by treating pellets of alumina in an autoclave in an acidic medium at a temperature above 100° C. for 1 to 20 hours, followed by drying the treated pellets and calcining the dried pellets. See U.S. Pat. No. 3,628,914.

A process for the manufacture of a pellet type of catalyst is known which comprises wet grinding a metal oxide, such as alumina, to obtain particles having a size less than 40 microns, and thereafter, molding the mass of particles into pellets at elevated pressures. See U.S. Pat. No. 2,921,033.

It is also known to increase the macroporosity of calcined alumina by treating the calcined alumina with certain organic acids, such as dicarboxylic acids. See U.S. Pat. No. 3,997,476.

A catalyst is also known having a total pore volume comprised of micropores and access channels, the latter being interstitially spaced throughout the structure of the micropores. The access channels having diameters between 100 and 1000 Angstroms constitute 10 to 40 percent of the total pore volume and the access channels having diameters greater than 1000 Angstroms constitute 10 to 40 percent of the pore volume while the remainder of the pore volume comprises 20 to 80 percent of micropores with diameters less than 100 Angstroms. See U.S. Pat. No. 3,630,888.

Hydroconversion in the presence of an ebullated catalytic macroporous microspheres smaller than 60 mesh and larger than 325 mesh (U.S. Standard), is known. See U.S. Pat. No. 3,622,500.

Pressures ranging from 5 to 20 tons per square inch to pelletize a mixture of catalyst constituents are known. Calcination can be conducted before or after pelleting. See U.S. Pat. No. 3,846,286.

It has now been found that a catalyst support prepared in accordance with the present invention will provide advantages that will become apparent in the ensuing description By the term "hydrotreating" is intended herein the contacting of a hydrocarbon feed with a catalyst in the presence of hydrogen under selected conditions to remove heteroatoms such as sulfur, oxygen and metallic contaminants such as nickel, vanadium and iron from the feedstock and/or to saturate aromatic hydrocarbons and/or olefinic hydrocarbons in the feedstock and/or to hydrocrack the feedstock.

The term "hydroconversion" is used herein to designate a catalytic hydrotreating process conducted in the presence of hydrogen in which at least a portion of the heavy constituents of the hydrocarbonaceous feedstock is converted to lower boiling hydrocarbon products. Simultaneously, the concentration of nitrogenous compounds, sulfur compounds and metallic contaminants of the feedstock may be reduced.

SUMMARY OF THE INVENTION

In accordance with the invention there is provided, a process for the preparation of a catalyst support which comprises the steps of: (a) grinding a calcined alumina to a powder, and (b) extracting the ground alumina with an extractant comprising an acid for a time sufficient to remove at least one weight percent of the alumina from the ground alumina.

When a support of a size greater than powder size is desired, the powder is compacted at elevated pressure to produce a compacted aggregate which is subsequently formed into a predetermined size particle. The acid extraction stage is then performed on the predetermined size particle.

The support may be composited with conventional catalytic components such as zeolites, hydrogenation components, reforming components and the like to produce catalysts which can be utilized in catalytic hydrocarbon treating processes.

DETAILED DESCRIPTION OF THE INVENTION

Figure 1:
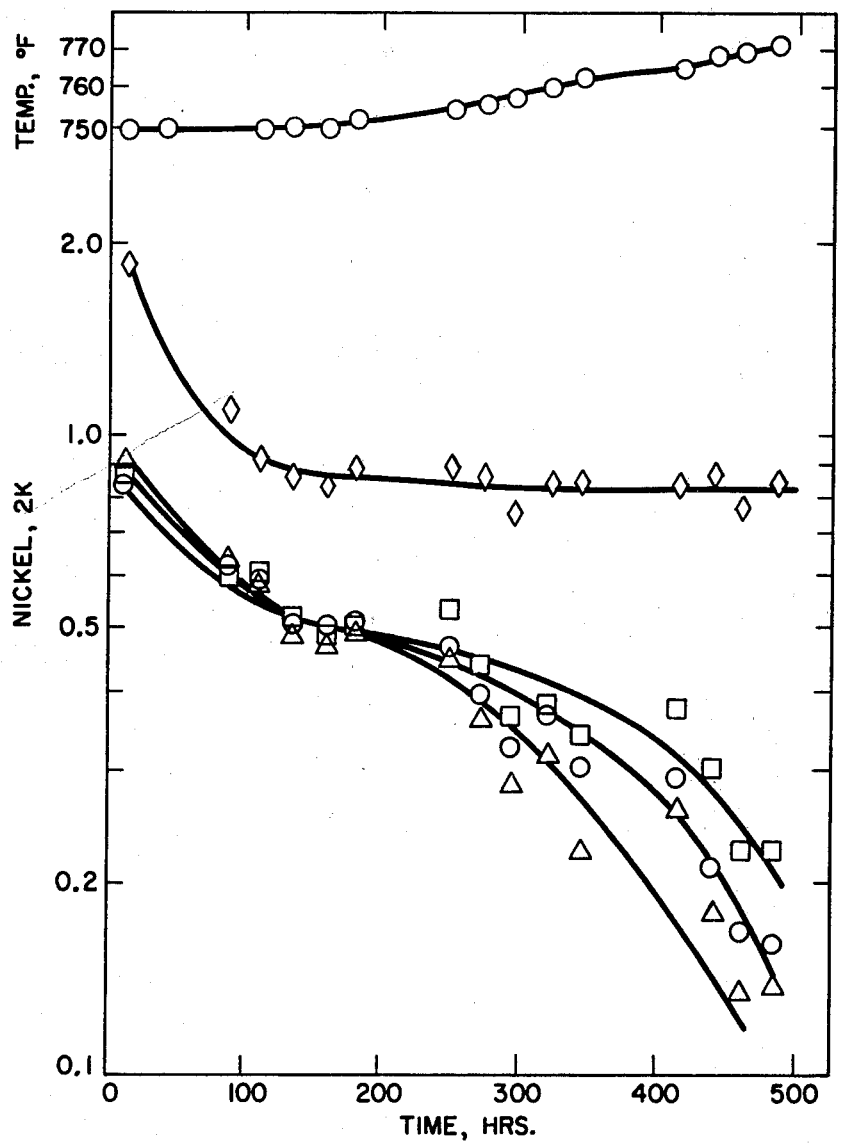
FIG. 1 is a plot showing nickel removal versus time during hydroprocessing of a Jobo crude utilizing a catalyst of the present invention.

The catalyst support of the present invention is produced by a sequence of steps which comprises grinding a calcined alumina to a powder. Suitable calcined aluminas for use as starting material are any of the conventionally available aluminas. Preferably, the calcined alumina is an eta or gamma alumina. The average pore size diameter of the initial calcined alumina may range from about 50 to about 250 Angstroms. The pore size diameter for pores above 200 Angstroms referred to herein is determined using a Mercury penetration porosimeter model 915-2 manufactured by Micromeritics Corporation, Norcross, Georgia. The surface tension of the mercury is taken at 474 dynes per centimeter at 25° C. and a contact angle of 140 degrees. The calculation of pore volume distribution is similar to that used by Orr Powder Technology, Volume 3, 1960–1970, pages 117–123. For example, a suitable calcined alumina is a gamma alumina having an average pore size diameter ranging from 50 to 200 Angstroms and a pore volume ranging from 0.3 to 1.5.

The calcined alumina may additionally comprise a minor amount of an oxide of at least one metal of Groups IIA, IIIA, IVA, IVB and mixtures thereof of the Periodic Table of Elements such as silica, zirconia, magnesia, thoria, etc. The Periodic Table referred to herein is in accordance with the table published by E. H. Sargent and Company, copyright 1962, Dyna Slide Co. When the calcined alumina comprises an additional oxide, the alumina is present in major amount, that is, it comprises more than 50 weight percent of the calcined composite, preferably more than 98 weight percent of the calcined composite used as starting material. A preferred calcined alumina for use as starting material is gamma alumina composited with from about 1 to about 6 weight percent silica, such as the catalyst support disclosed in Adams et al. U.S. Pat. No. 3,509,044. The calcined alumina starting material, which may additionally comprise a minor amount of the above-mentioned oxides, is ground to a powder having a particle size ranging from about 10 to about 400 mesh Tyler. The resulting powder is compacted at an elevated pressure, preferably at a pressure of at least 20,000 psig, more preferably at a pressure of at least 40,000 psig to produce a compacted aggregate. The compacted aggregate is formed into a particle of a predetermined size, for example, by breaking the aggregate to obtain the desired size particles, suitably particles of 14 to 35 mesh Tyler which are equivalent to 1/32 inch extrudates. When the support is intended for a catalyst to be used in a fixed bed process, the particles are made into ⅛ to 1/64, typically 1/32 inch particles. When the support is intended for a catalyst to be used in a slurry process, particles having a size ranging from about 10 to about 400 mesh Tyler (20 to 150 microns), typically 100 mesh Tyler, are produced. When the ultimately desired size particle is the size obtained from the grinding step, for example, a powder having particles ranging from about 10 to about 100 mesh Tyler, then the steps of compacting the powder to form an aggregate and acid extracting can be omitted. After the compacted powder has been formed into the predetermined size particle, the predetermined size particle is extracted with an extractant which comprises an acid. The extractant may additionally comprise an alcohol. The extraction is performed by contacting the predetermined size alumina-containing particle with the extractant for a time sufficient to remove at least 1 weight percent, preferably from about 2 to about 10 weight percent alumina from the alumina present in the predetermined size particle. It is believed that the extraction step removes preferentially the alumina which is present in the interstitial spaces and that, therefore, the extraction step clears the interstitial spaces, thereby permitting easier access of the feed molecules into the pores of the support. Suitable acids for use in the extractant are inorganic acids and organic acids. Preferably, an inorganic acid is used such as $HNO_3$, etc. Suitable concentrations of acids include from about 1 to 20 weight percent, preferably from about 2 to about 15 weight percent, more preferably from about 5 to about 10 weight percent acid based on the alumina being treated. Suitable alcohols that may be included in the extractant solution comprise methyl, ethyl, isopropyl or higher boiling alcohols that may easily be removed during the drying stage.

The acid extraction is conducted at a temperature ranging from about 60° F. to about 150° F., preferably at a temperature ranging from about 70 to about 100° F., and atmospheric pressure for a period of time sufficient to remove the desired amount of alumina from the particle. Suitable time periods include from about 1 to about 24 hours, preferably from about 2 to about 16 hours. The temperature, pressure and time of treatment are not critical provided the desired amount of alumina is removed from the ground alumina without otherwise adversely affecting the ground alumina.

After the alumina-containing particle of predetermined size has been acid treated, it is separated from the extractant, for example, by filtration or decantation, washed, dried in air or in a vacuum oven and subsequently calcined, for example, at a temperature ranging from about 750 to about 1200° F., preferably at a temperature ranging from about 950 to about 1000° F. for a period of time ranging from about 1 to about 16 hours.

To produce a catalyst, known catalytic components are composited with the support. The catalytic components which may be zeolites, metals, metal compounds or mixtures thereof may be composited with the support at any appropriate stage. When the catalytic component is a metal or metal compound, it is preferably added to the support after the drying step and prior to the calcination step, that is, the composite of alumina support plus catalytic metal component is calcined without an intervening calcination of the support itself. If desired, the finished catalyst may be sulfided prior to use in a conventional manner.

The alumina-containing ground and acid extracted support may be advantageously used as support for catalytic components which function as hydrocarbon treating catalysts. Thus, the support can be composited with one or more of the known metal components which catalyze hydrocarbon reactions. In general, these metals or compound of such metals include Groups IB, IIA, IIIB, IVA, IVB, VB, VIB, VIIB, VIII and rare earth lanthanide series. For use in hydrotreating processes including hydrorefining, hydrodesulfurization, hydrodenitrogenation, hydrodemetallization, hydroconversion and hydrocracking, the support of the present invention is composited by conventional techniques with metals and metal compounds of Groups VIB and VIII. For hydrorefining, hydrodemetallization, hydrodesulfurization and hydroconversion, the support of the present invention is composited with metals and metal compounds of Group IVB and non-noble metals and metal compounds of Group VIII, such as, for example, molybdenum, tungsten, nickel and cobalt components either alone or in combination thereof. For use in hydrotreating, preferably the catalytic metal component is a hydrotreating component selected from the group consisting of cobalt, cobalt oxide, cobalt sulfide, nickel, nickel oxide, nickel sulfide, molybdenum, molybdenum sulfide, molybdenum oxide, tungsten, tungsten oxide, tungsten sulfide and mixtures thereof. Suitable amounts of hydrotreating metal components in the finished catalyst comprising the support of the present invention are from about 8 to about 30 percent, preferably from about 12 to about 20 percent Group VIB metal component calculated as the metal oxide and from about 1 to about 6 weight percent, preferably from about 3.5 to about 5.0 weight percent Group VIII metal component, calculated as the metal oxide, based on the total finished catalyst. For reforming low octane naphtha to a higher octane product, the support of the present invention is composited by conventional techniques with a noble metal and other metal modifiers of Groups VIII, VIB, IVB, IB, IVA, VIA, such as platinum, iridium, rhenium, palladium, copper, chromium, zirconium, tin and selenium. Suitable concentrations include from about 0.05 to about 5, preferably from about 0.1 to 1.0 weight percent noble metal of Group VIII and from about 0.02 to about 2 weight percent metal modifiers. The ground and acid extracted alumina support may additionally comprise from about 0.1 to about 2 weight percent of a Group IIA, Group IIIB, Group IV component or mixtures thereof, such as magnesium, calcium, lanthanum and calcium.

For use in catalytic cracking processes in the absence of added hydrogen, the ground and acid extracted alumina may be composited with conventional catalytic cracking components such as inorganic oxide cracking components and/or zeolites. Suitable inorganic oxide components for use with the ground and acid extracted alumina of the present invention include silica, silica-alumina, silica-zirconia, silica-magnesia, alumina-boria, alumina-titania and the like and mixtures thereof. The crystalline aluminosilicate zeolite may be chosen from any of the known zeolites. Examples of these zeolites include the zeolites designated by the Linde Division of Union Carbide by the letters X, Y, A, L (these zeolites are described in U.S. Pat. Nos. 2,882,244; 3,130,007; 2,882,243 and Belgian Pat. No. 575,117, respectively), ultrastable Y-type zeolites described, for example, in U.S. Pat. Nos. 3,293,192 and 3,402,996 and the publication, Society of Chemical Engineering (London) Monograph Molecular Sieves, p. 186 (1968) by C. V. McDaniel and P. K. Maher; zeolite ZSM-5 described in U.S. Pat. No. 3,702,866 and in Nature, vol. 272, Mar. 30, 1978, pp. 437–438, as well as naturally occurring zeolites such as faujasite, chabazite, erionite, mordenite, offretite, gmelinite, analcite, etc. The zeolites, as produced or found in nature normally contain an alkali metal such as sodium and/or potassium and/or an alkaline earth metal such as calcium and magnesium. The zeolites differ from each other in structure, composition and particularly in the ratio of silica to alumina contained in the crystal lattice structure. For use in hydrocarbon conversion processes the higher ratio silica to alumina among isostructural zeolites are preferred because of their stability at elevated temperature, particularly in the presence of steam. Therefore, whereas the zeolite component to be used in combination with the ground and acid extracted alumina of the present invention may be any of the above-stated zeolites, the zeolites having silica to alumina ratios above 3 will be preferred. This includes natural and synthetic faujasite and mordenite. The crystalline zeolites have uniform pore openings ranging in diameter from 3 to 15 Angstroms. The preferred pore size zeolite component for use with the support of the present invention will be zeolites having uniform pore size diameters ranging from about 6 to about 15 Angstroms. It is usually necessary to reduce the alkali metal content of the zeolite to a content of less than 10 weight percent, preferably less than 6 weight percent and more preferably about 1 to 5 weight percent since the alkali metal components are normally undesirable catalytic components for the desired hydrocarbon conversion reaction. The alkali metal content reduction may be accomplished, as is well known in the art, by exchange with any one or more of the cations selected from Group IB through Group VIII metals of the Periodic Table of Elements, as well as hydrogen cation or hydrogen precursor (i.e., $NH_4^+$) capable of conversion to hydrogen cation. The preferred cations are those selected from the Group consisting of rare earth metals, calcium, magnesium, hydrogen and mixtures thereof. A particularly preferred zeolite is "ultrastable" Y-type faujasite. In general, "ultrastable" refers to a Y-type zeolite which is resistant to degradation of crystallinity by high temperatures and steam treatment and is characterized by an $R_2O$ content (wherein R is Na, K, or any other alkali metal ion) of less than 1 weight percent and a unit cell size less than 24.50 Å and a $SiO_2/Al_2O_3$ mole ratio in the range of 3.5 to 7 or higher. The ultrastable form of the Y-type zeolite is obtained by the virtual elimination of the alkali metal ion and the unit cell size reduction after the alkali metal removal step. The zeolite component may suitably be present in an amount ranging from about 2 to about 20 weight percent of the final cracking catalyst. The ground and acid extracted alumina of the present invention may range from about 2 to about 40, preferably from about 2 to about 25 weight percent of the final cracking catalyst.

The physical characteristics of the final catalyst starting with a calcined gamma alumina are given in Table I.

TABLE I

| Physical Characteristics | Broad | Typical Example |
|---|---|---|
| Surface Area, m²/g | 200–400 | 290 |
| Pore Volume, cc/g | 0.5–1 | 0.7 |
| Averge Pore Diameter, Å | 80–200 | 120 |
| Pore Volume Distribution, cc/g | | |
| Less than 30 Å | 2–10 | 5 |
| 30–100 Å | 70–80 | 75 |
| Above 500 Å | 5–30 | 20 |
| Particle Size, Inches for Fixed Bed | 1/8 to 1/64 | 1/32 |
| Particle Size, Mesh for Slurry Bed | 10–400 | 100 |

A specific embodiment of a catalyst preparation method of the present invention for a fixed bed catalyst is as follows:

Grinding a commercially available calcined alumina, such as gamma alumina, to less than 100 mesh Tyler. Compressing the powder at 40,000 psig. Cracking the compressed powder to 14/35 mesh Tyler. Extracting the 14/35 mesh particles with $HNO_3$ (5–10% on $Al_2O_3$) in alcohol. Drying and impregnating with cobalt and molybdenum salts. Air calcining at 950° F. for 16 hours. The catalyst of the present invention may be disposed in a fixed bed including staged reactor systems, a moving bed, slurry, fluidized bed, suspension, and ebullated bed.

The conditions and feeds suitable for hydrocarbon treating processes in which the catalyst of the present invention can be used are well known in the art.

Table II summarizes several typical reaction conditions effective in the present invention.

TABLE II

| Principal Conversion Desired | Reaction Conditions | | | Hydrogen Rate, SCF/bbl |
|---|---|---|---|---|
| | Temperature °F. | Pressure, psig | Feed Rate, V/V/Hr. | |
| Hydro-refining | 500–800 | 50–5000 | 0.1–10.0 | 500–10,000 |
| Hydro-cracking | 450–850 | 200–5000 | 0.1–2.0 | 500–20,000 |
| Catalytic Cracking | 700–1000 | 0–50 | 0.1–20.0 | — |
| Catalytic Reforming | 850–1000 | 50–1000 | 0.1–20 | 500–10,000 |

Suitable hydrodesulfurization conditions are shown in Table III.

TABLE III

| Conditions | Broad Range | Preferred Range[1] | Preferred Range[2] |
|---|---|---|---|
| Temp., °F. | 400–850 | 450–700 | 650–825 |
| Pressure, psig | 100–5000 | 100–1500 | 1000–3000 |
| Liquid Hourly | 0.05–3.0 | 0.5–5.0 | 0.1–0.5 |

TABLE III-continued

| Conditions | Broad Range | Preferred Range[1] | Preferred Range[2] |
|---|---|---|---|
| Space Velocity V/V/Hr. | | | |
| Hydrogen Rate, SCF/bbl. | 300–20,000 | 200–4000 | 4000–16,000 |
| Hydrogen Partial Pressure, psig | 100–5000 | 100–1200 | 1000–2500 |

[1]Naphtha-distillate feed
[2]Residua feed

When it is desired to hydrodesulfurize the hydrocarbonaceous feedstock with minimal hydrocarbon cracking, a substantially non-acidic catalyst support is utilized.

Suitable hydroconversion conditions are shown in Table IV for distillates and heavier feeds.

TABLE IV

| Conditions | Broad Range | Preferred Range |
|---|---|---|
| Temp., °F. | 500–850 | 650–750 |
| Pressure, psig | 800–5000 | 1500–3000 |
| Liquid Hourly Space Velocity V/Hr./V | 0.1–5.0 | 0.25–2.0 |
| Hydrogen Rate, SCF/bbl | 1000–20,000 | 2000–16,000 |
| Hydrogen Partial pressure, psig | 800–5000 | 1000–2500 |

The feedstocks suitable for the hydrocarbon treatment and conversion of the present invention include any of the well known feeds conventionally employed in hydrocarbon treating and conversion processes.

Suitable hydrocarbonaceous feedstock for use in the hydrodesulfurization process or in a hydroconversion process of the present invention are heavy hydrocarbonaceous oils, particularly sulfur-containing heavy hydrocarbonaceous oils such as whole petroleum crude oils, including heavy crudes, topped or reduced petroleum crude oils, heavy petroleum distillates such as gas oils; petroleum atmospheric residuum; petroleum vacuum residuum; bitumen; tar sand oil; shale oil; liquids derived from coal liquefaction processes including coal liquefaction bottoms and mixtures thereof. When the support of the present invention is composited with hydrotreating catalytic components to produce a hydrotreating catalyst, the resulting catalyst of the present invention is particularly well suited for treating heavy crude oils and residual oils that generally contain a high content of metallic contaminants such as nickel, iron and vanadium and a high content of sulfur compounds. The metal contents of such oils may range up to 2000 wppm or more and the sulfur content may range up to 8 weight percent or more.

When the support of the present invention is the base for conventional reforming catalytic components to produce reforming catalysts, the feedstock would be a conventional feedstock (virgin, hydrocrackate and catalytic naphthas) used in reforming processes, for example, naphtha and conventional reforming conditions. Similarly when the support of the present invention is composited as a catalyst component with catalytic cracking components and used in the absence of added hydrogen, conventional catalytic cracking conditions and feedstocks may be used.

PREFERRED EMBODIMENTS

The following examples are presented to illustrate the invention.

EXAMPLE 1

The calcined extrudates used as starting material to prepare a catalyst of the present invention had the physical characteristics shown in Table V.

TABLE V

| ALUMINA INSPECTIONS | |
|---|---|
| Surace area, m$^2$/g (BET) | 270 |
| Pore volume, cc/g (BET) | 0.54 |
| Average Pore Diameter, Å (Calc.) | 80 |
| Macroporosity, cc/g[1] | .05 |

[1]Mercury porosimeter used to measure pores >500 Å

A catalyst was prepared by extracting 100 grams of the calcined alumina extrudates with a dilute nitric acid solution (5 wt. % HNO$_3$ acid on alumina dispersed in 500 ml. water) at room temperature for 16 hours. The alumina was then filtered from the acid solution, washed several times with water and then vacuum (26 inches Hg) air dried at 250° F. to remove the absorbed water. The acid extracted extrudates were then ground to 100–400 mesh material. The ground alumina was then compacted at 40,000 psig to form a large solid mass of alumina; recracked to 14/35 mesh material. The vacuum dried 14/35 mesh material obtained from the reconstituted alumina was dispersed in 500 ml. of methyl alcohol that contained 5 wt. % nitric acid based on alumina and then treated at room temperature for 16 hours. The 14/35 mesh alumina was removed by filtration from the alcohol-acid solution, alcohol washed several times; vac-air dried at 250° F. to remove the excess alcohol from the pores of the acid extracted alumina and finally impregnated with a methyl alcohol solution of cobalt acetate and phosphomolybdic acid to result in a catalyst containing 3.5% cobalt and 16.6% molybdenum as the oxide on the acid extracted alumina after drying and calcining at 950° F. for 16 hours. The finished catalyst, which is a catalyst of the present invention, had the physical characteristics shown in Table VI.

TABLE VI

| CATALYST INSPECTIONS | |
|---|---|
| Surface Area, m$^2$/g | 244 |
| Pore Volume, cc/g | .73 |
| Macroporosity, cc/g[1] | 0.31 |
| Averge Pore Diameter, Å (Calc.) | 120 |

[1]Mercury porosimeter used to measure pores >500Å.

As can be seen from Tables V and VI, the catalyst of the invention, when prepared on the acid extracted reconstituted ground alumina had a six fold increase in macropore volume over that of the original calcined alumina used as starting material.

EXAMPLE 2

Comparative hydrotreating experiments were made utilizing a Jobo crude oil having the characteristics shown in Table VII.

TABLE VII

| JOBO CRUDE | |
|---|---|
| Inspections | |
| Gravity, °API | 8.9 |

TABLE VII-continued

| JOBO CRUDE | |
|---|---|
| Inspections | |
| Sulfur, Wt. % | 4.29 |
| Nitrogen, Wt. % | 0.672 |
| Metals, ppm | |
| Ni | 110 |
| V | 446 |
| Carbon, Wt. % | 84.69 |
| Hydrogen, Wt. % | 10.43 |
| Conradson Carbon, Wt. % | 16.7 |
| %1050° F+, Wt. % | 55.7 |

The catalysts used in these experiments had equivalent chemical compositions, but different physical properties. A commercially available calcined gamma alumina having an average pore diameter of about 80 Angstroms was used. All catalysts were impregnated to have a metal level of 3.5 weight percent CoO and 16.6 weight percent $MoO_3$ on 14/35 mesh Tyler particles of alumina. Catalyst A was prepared on the commercial alumina. The alumina was initially extracted with a dilute water solution of nitric acid (5 weight percent nitric acid to alumina) at room temperature for 16 hours in order to extract a portion of the alumina. The acid extracted alumina was then used as the catalyst support for Catalyst B and a portion was ground to a fine powder. The ground alumina powder portion was compacted at 40,000 psig, to form a large solid mass of alumina, recracked to 14/35 mesh Tyler and a portion of the 14/35 mesh alumina was used as catalyst support for Catalyst C. The remainder of the reconstituted 14/35 mesh alumina was then extracted a second time with a like quantity of nitric acid in methyl alcohol. The acid extracted 14/35 mesh alumina freed of methanol was dried and used as the support for Catalyst D which is a catalyst of the present invention. When using a water solution for the second extraction step, the reconstituted 14/35 mesh particles did not maintain their particle size, but appeared to be similar in size to the ground alumina prior to compacting at 40,000 psig, thus indicating that the excess alumina within the interstitial pores of the compacted aggregate had been extracted and the alumina portion that gave the binding force (trash alumina extracted) of the 14/35 mesh aggregate was removed by the extraction step. The compositions and physical properties of the catalyst are summarized in Table VIII.

Catalyst D is a catalyst in accordance with the present invention. The remaining catalysts are reference catalysts.

Figure 2:
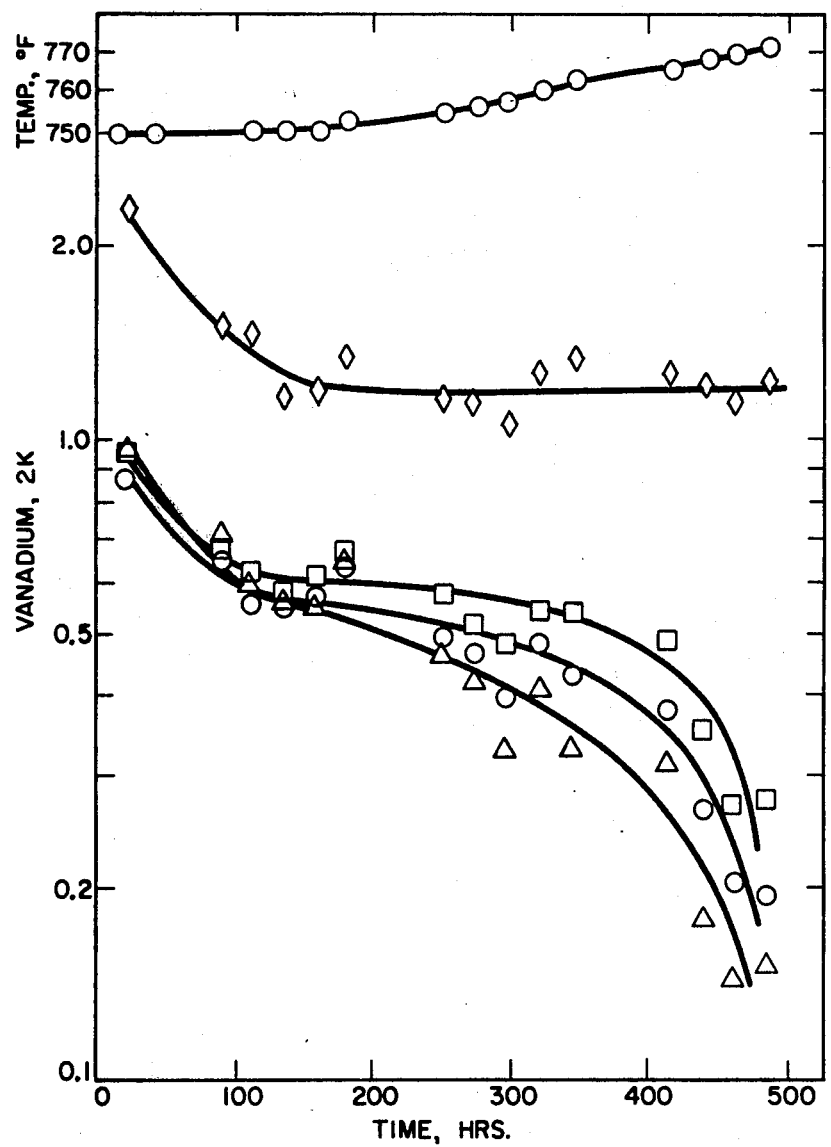
FIG. 2 is a plot showing vanadium removal versus time during hydroprocessing of a Jobo crude utilizing a catalyst of the present invention.
Figure 3:
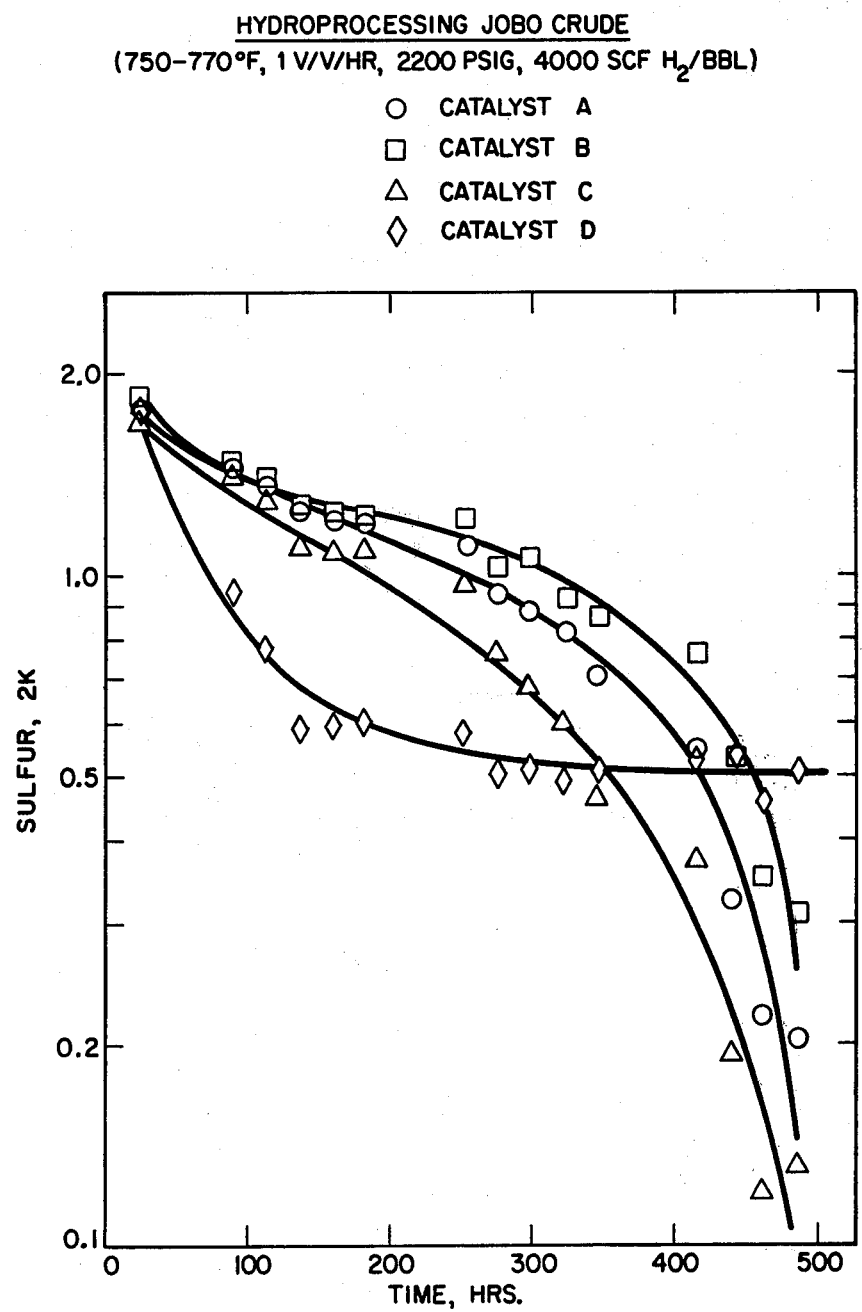
FIG. 3 is a plot showing sulfur removal versus time during hydroprocessing of a Jobo crude utilizing a catalyst of the present invention.

The experiments were conducted at a pressure of 2200 psig with a hydrogen rate of 4,000 SCF $H_2$/bbl at a space velocity of 1 V/V/Hr. The results of these experiments relative to nickel removal are summarized in FIG. 1. The results of these experiments relative to vanadium removal are summarized in FIG. 2. The results of these experiments relative to sulfur removal are summarized in FIG. 3.

As can be seen from the data of these experiments, Catalyst D, which is a catalyst in accordance with the present invention, showed better vanadium and nickel removal from the feed than the reference catalysts and maintained its activity at a lower level for sulfur removal than the reference catalysts, even though twice as much feed metal had been deposited for the time period being evaluated. Catalyst C, lowest in macroporosity, deactivated the fastest with Catalysts A and B also showing rapid decline for both sulfur and metals after 300 hours of operation.

EXAMPLE 3

A ground commercial calcined alumina (100 grams) in powder form (100–200 mesh) was dispersed in a solution of 500 ml. methyl alcohol-5 grams of nitric acid for 16 hours at room temperature. The acid extracted alumina was filtered from the solution, methyl alcohol washed and then vac.-air dried at 250° F. to remove excess methyl alcohol. The acid extracted alumina was then impregnated with a methyl alcohol solution of cobalt acetate and phosphomolybdic acid to result in Catalyst E containing 3.5% cobalt and 16.6% molybdenum as the oxide after drying and calcining at 950° F. for 16 hours. The finished catalyst had the following physical properties shown in Table IX and is a catalyst in accordance with the present invention.

TABLE IX

| CATALYST E INSPECTIONS | |
|---|---|
| Surface Area, $m^2$/g | 240 |
| Pore Volume, cc/g | 0.72 |
| Macroporosity, cc/g[1] | 0.22 |
| Average Pore Diameter, Å (Calc.) | 120 |

[1]Mercury porosimeter used to measure pores >500Å

EXAMPLE 4

A portion of the ground commercial alumina (100–200 mesh) used for the catalyst preparations in

TABLE VIII

| | | CATALYST[1] IDENTIFICATION AND INSPECTIONS | | | | | | |
|---|---|---|---|---|---|---|---|---|
| | | B.E.T. Data | | | Macro Porosity Data | | | |
| | | | | | P.V. in | P.V. in | P.V. in | P.V. in |
| Catalyst | Treat | S.A. | P.V. | P.D. | 500 Å | 5000 Å | 10,000 Å | 20,000Å |
| A | Base Alumina, None | 255 | 0.53 | 83 | .029 | .010 | .009 | .008 |
| B | $HNO_3$ Extracted | 277 | 0.59 | 85 | .031 | .010 | .008 | .008 |
| C | Powdered-Repilled $Al_2O_3$ Base for Catalyst B | 260 | 0.41 | 63 | .021 | .008 | .006 | .005 |
| D | $HNO_3$ Extracted $Al_2O_3$ Base for Catalyst C | 244 | 0.42 0.71* | 69 120* | .113 | .081 | .067 | .052 |

[1]Catalyst contains 3.5% CoO/16.6% $MoO_3$.
*Hg porosimeter measurement indicating pore volume increase due to interstitial pores created by the acid extraction and thus calculated average pore diameter of 120 Å. that is a blend of the micro and macro pores.

Example 3 was vac.-air dried and impregnated with a methyl alcohol solution of cobalt acetate and phosphomolybdic acid to result in Catalyst F containing 3.5% cobalt and 16.6% molybdenum as the oxide after drying and calcining at 950° F. for 16 hours. The finished catalyst had the physical properties shown in Table X. Catalyst F is not a catalyst in accordance with the present invention.

TABLE X

| CATALYST F INSPECTIONS | |
|---|---|
| Surface Area, m²/g | 245 |
| Pore Volume, cc/g | 0.53 |
| Macroporosity, cc/g[1] | 0.04 |
| Average Pore Diameter, Å (Calc.) | 86 |

[1]Mercury porosimeter used to measure pores >500Å.

EXAMPLE 5

Comparative hydrotreating experiments with Catalysts E and F were made utilizing a light Arabian atmospheric residuum feed having the characteristics shown in Table XI.

TABLE XI

| LIGHT ARABIAN ATMOSPHERIC RESIDUUM | |
|---|---|
| Gravity, °API | 15.3 |
| Sulfur, Wt. % | 3.46 |
| Nitrogen, Wt. % | 0.1708 |
| Metals, ppm | |
| Ni | 9.3 |
| V | 33.4 |
| Carbon, Wt. % | 85.47 |
| Hydrogen, Wt. % | 11.18 |
| Conradson Carbon, Wt. % | 9.83 |
| % 1050° F+, Wt. % | 41.6 |

The experiments were conducted at a temperature of 700° F., 2200 psig, 0.25 V/V/Hr. with hydrogen gas rate of 16,000 SCF/bbl. The results of the experiments are summarized below in Table XII.

TABLE XII

| HYDROPROCESSING LIGHT ARABIAN ATMOSPHERIC RESIDUUM WITH 100-200 MESH CoMo Al₂O₃ CATALYSTS | | |
|---|---|---|
| | Catalyst E | Catalyst F |
| | (Acid Extracted Macro Pore Catalyst) | (Non-Acid Extracted non Macro Pore Catalyst) |
| Operating Conditions | | |
| Tempeature, °F. | 700 | |
| V/V/Hr. | 0.25 | |
| Pressure, psig | 2250 | |
| Gas Rate, SCF/bbl. | 16,000 | |
| Hours on Stream | 200 | |
| Sulfur Activity, 1.5 Order | 3.5 | 0.8 |
| Liquid Product Inspections | | |
| Gravity, °API | 28.0 | 23.0 |
| Sulfur, Wt. % | 0.021 | 0.22 |
| Nitrogen, Wt. % | 0.01 | 0.07 |
| Conradson Carbon, Wt. % | 0.3 | 3.6 |
| Metals, ppm | | |
| Ni | 0.04 | 0.5 |
| V | 0.01 | 0.2 |
| % Sulfur Removal | 99.5 | 94.0 |
| % Nitrogen Removal | 95.0 | 54.9 |
| % Conradson Carbon Removal | 96.9 | 64.7 |
| % Metals Removal | 100.0 | 99.0 |

The comparative data given in Table XII clearly shows improved hydrotreatment of the atmospheric residuum feed when utilizing Catalyst E that has been prepared according to the present invention. The macropore catalyst shows essentially complete removal of the heteroatom, Conradson carbon precursors and feed metals or about ten fold lower sulfur and Conradson carbon content and seven fold lower nitrogen content when compared with the non-acid extracted low macropore Catalyst F. Even at this level of conversion there was no apparent incompatible material present that is normally associated with high conversions (85–90%) taught by the art when processing residua feeds with less active, catalysts that require high temperatures (>780° F.) or hydro-thermal conversion conditions.

What is claimed is:

1. A process for the preparation of a catalyst support which comprises the steps of:
    (a) grinding a calcined alumina to a powder having a diameter ranging from about 10 to about 400 mesh Tyler, and
    (b) extracting the ground alumina with an extractant comprising an acid selected from the group consisting of inorganic acids and organic acids, for a time sufficient to remove at least 1 weight percent of said alumina from said ground alumina.

2. The process of claim 1 wherein said powder resulting from step (a) is compacted at an elevated pressure to form a compacted aggregate and wherein said compacted aggregate is formed into a predetermined size particle and, thereafter, extracting said predetermined size particle with said extractant.

3. The process of claim 1 wherein said calcined alumina is ground to a powder having a diameter ranging from about 10 to about 100 mesh Tyler.

4. The process of claim 2 wherein said powder is compacted at a pressure of at least 20,000 psig.

5. The process of claim 1 or claim 2 wherein said acid is an inorganic acid.

6. The process of claim 2 wherein after said extraction step, the acid extracted predetermined size particle is dried.

7. The process of claim 2 wherein said particle formed from said compacted aggregate has a size ranging from about ⅛ to about 1/64 inch in diameter.

8. The process of claim 2 wherein said particle formed from said compacted aggregate has a size ranging from about 10 to about 400 mesh Tyler.

9. The process of claim 2 wherein said particle formed from said compacted aggregate has a size ranging from about 10 to about 100 mesh Tyler.

10. The process of claim 6 wherein said extractant also comprises an alcohol that may easily be removed during said drying stage.

11. The process of claim 1 or claim 2 wherein said calcined alumina of step (a) additionally comprises a minor amount of at least one oxide of a Group IIA, Group IIIA, Group IVA and Group IVB of the Periodic Table of Elements.

12. The process of claim 1 or claim 2 wherein said calcined alumina of step (a) additionally comprises a minor amount of silica.

13. The process of claim 6 wherein said dried particle is calcined at a temperature ranging from about 750° to about 1200° F.

14. A process for the preparation of a catalyst support which comprises the steps of:
    (a) grinding a calcined alumina to a powder having a diameter ranging from about 10 to about 400 mesh Tyler;

(b) compacting said powder at an elevated pressure to produce a compacted aggregate;

(c) forming said compacted aggregate into a predetermined size particle;

(d) extracting the predetermined size particle with an extractant comprising an acid selected from the group consisting of inorganic acids and organic acids, at a temperature ranging from about 60 to about 150° F. for a time sufficient to remove from about 2 to about 10 percent alumina from said predetermined size particle;

(e) drying said acid extracted predetermined size particle; and (f) calcining said dried particle.

15. A process for the preparation of a catalyst which comprises the steps of:

compositing at least one catalytic component selected from the group consisting of (i) a crystalline aluminosilicate zeolite, (ii) a metal component selected from the group consisting of a metal or a compound of a metal from the group of IB, IIA, IIIB, IVA, IVB, VB, VIB, VIIB, VIII, rare earth metals and mixtures thereof, with an alumina support prepared by the steps which comprise: (a) grinding a calcined alumina to a powder, and (b) extracting the ground alumina with an extractant comprising an acid selected from the group consisting of inorganic acids and organic acids, for a time sufficient to remove at least one weight percent of said alumina from said ground alumina.

16. The process of claim 15 wherein said powder resulting from step (a) is compacted at an elevated pressure to form a compacted aggregate and wherein said compacted aggregate is formed into a predetermined size particle and, subsequently, extracting said predetermined size particle with said extractant.

17. The process of claim 15 or claim 16 wherein the acid extracted alumina, without intervening calcination, is composited with said metal component and wherein the resulting composite is calcined.

18. The process of claim 15 or claim 16 wherein said catalytic component comprises a crystalline aluminosilicate zeolite.

19. The process of claim 15 or claim 16 wherein said catalytic component comprises a metal component selected from the group consisting of Group VIB and Group VIII of the Periodic Table of Elements.

20. The process of claim 15 or claim 16 wherein said metal component is selected from the group consisting of IB, IVA, VIA, VIB, VIII and mixtures thereof of the Periodic Table of Elements.

21. The process of claim 15 or claim 16 wherein after said extraction step, the remaining acid extracted alumina is dried and subsequently calcined.

22. The process of claim 21 wherein said catalyst comprises a metal component selected from the group consisting of a metal or compound of a metal of Group IVB and Group VIII and mixtures thereof and wherein after said drying step, the resulting dried particles are composited with said metal component.

23. The process of claim 15 wherein said calcined alumina is ground to a powder having a diameter ranging from about 10 to about 100 mesh Tyler.

24. The process of claim 16 wherein said calcined alumina is ground to a powder having a diameter ranging from about 10 to about 400 mesh Tyler.

25. The process of claim 16 wherein said powder is compacted at a pressure of at least about 20,000 psig.

26. The process of claim 15 or claim 16 wherein said acid is an inorganic acid.

27. The process of claim 21 wherein said extractant comprises an alcohol that may easily be removed during said drying step.

28. The process of claim 16 wherein said particle formed from said compacted aggregate has a size ranging from about ½ to about 1/64 inch in diameter.

29. The process of claim 16 wherein said particle formed from said compacted aggregate has a size ranging from about 10 to about 400 mesh Tyler.

30. The process of claim 16 wherein said particle formed from said compacted aggregate has a size ranging from about 10 to about 100 mesh Tyler.

31. The process of claim 15 or claim 16 wherein said calcined alumina of step (a) additionally comprises a minor amount of at least one oxide of a Group IIA, Group IIIA, Group IVA and Group IVB of the Periodic Table of Elements.

32. The process of claim 15 or claim 16 wherein said calcined alumina of step (a) additionally comprises a minor amount of silica.

33. The process of claim 15 or claim 16 wherein said catalyst comprises a metal component and wherein said catalyst has a surface area ranging from about 200 to about 400 m$^2$/g, a pore volume ranging from about 0.5 to about 1.0 cc/g; and an average pore diameter ranging from about 80 to about 200 Angstroms.

34. The process of claim 1 wherein said extractant also comprises a $C_1$ to $C_4$ aliphatic alcohol.

35. The process of claim 15 wherein said extractant also comprises a $C_1$ to $C_4$ aliphatic alcohol.

36. The process of claim 15, wherein said metal component is selected from the group consisting of cobalt, cobalt oxide, cobalt sulfide, nickel, nickel oxide, nickel sulfide, molybdenum, molybdenum sulfide, molybdenum oxide, tungsten, tungsten oxide, tungsten sulfide and mixtures thereof.

* * * * *